US009954633B2

(12) United States Patent
Pralea

(10) Patent No.: US 9,954,633 B2
(45) Date of Patent: Apr. 24, 2018

(54) APPARATUS AND METHOD OF PERFORMING A DECIMATION ON A SIGNAL FOR PATTERN DETECTION

(71) Applicant: FREESCALE SEMICONDUCTOR, INC., Austin, TX (US)

(72) Inventor: Radu D. Pralea, Bucharest (RO)

(73) Assignee: NXP USA, Inc., Austin, TX (US)

( * ) Notice: Subject to any disclaimer, the term of this patent is extended or adjusted under 35 U.S.C. 154(b) by 204 days.

(21) Appl. No.: 14/830,100

(22) Filed: Aug. 19, 2015

(65) Prior Publication Data

US 2016/0373222 A1    Dec. 22, 2016

(30) Foreign Application Priority Data

Jun. 18, 2015   (RO) .................................. 2015 00414

(51) Int. Cl.
*H04J 11/00*       (2006.01)
*H04B 1/707*       (2011.01)

(52) U.S. Cl.
CPC .............. *H04J 11/00* (2013.01); *H04B 1/707* (2013.01)

(58) Field of Classification Search
None
See application file for complete search history.

(56) References Cited

U.S. PATENT DOCUMENTS

| 5,920,589 | A  | * | 7/1999 | Rouquette ............. H04B 1/707 375/147 |
| 6,111,911 | A  | * | 8/2000 | Sanderford, Jr. ...... H04B 1/707 375/141 |
| 6,353,644 | B1 | * | 3/2002 | Cai ................... H04L 25/03038 375/285 |

(Continued)

FOREIGN PATENT DOCUMENTS

| CN | 102076006 A | 5/2011 |
| CN | 103229422 A | 7/2013 |

(Continued)

OTHER PUBLICATIONS

"Extended Overlap—Add and—Save Methods for Multirate Signal Processing" by S. Muramatsu and H. Kiya, IEEE Transactions on Signal Processing, vol. 45, No. 9, Sep. 1997, pp. 2376-2380, IEEE 1053-587X.

*Primary Examiner* — Gregory B Sefcheck

(57) ABSTRACT

The present application relates to a receiver for performing a decimation on a signal for pattern detection and a method of operating thereof. A frequency-domain decimator component and a pattern detector component arranged at the receiver are provided. The frequency-domain decimator component is coupled to at least one antenna to receive an input sequence of samples of the signal received at the at least one antenna. The frequency-domain decimator component is further configured to apply an anti-aliasing filter and to decimate the input sequence. The frequency-domain decimator component is further arranged to output the input (Continued)

sequence filtered and decimated as output sequence. The pattern detector component is coupled to the frequency-domain decimator component to receive the output sequence. The pattern detection component is further configured to perform a pattern detection based on cross-correlation values in frequency domain between the output sequence and predefined patterns.

17 Claims, 9 Drawing Sheets

(56) References Cited

U.S. PATENT DOCUMENTS

| | | | | |
|---|---|---|---|---|
| 7,843,970 | B2* | 11/2010 | Yang | H04L 27/2647 370/208 |
| 8,369,639 | B2* | 2/2013 | Yokose | H04N 19/176 382/166 |
| 8,422,602 | B2* | 4/2013 | Masuda | H04L 27/2647 375/343 |
| 8,594,250 | B2* | 11/2013 | Mansour | H04J 11/00 370/210 |
| 8,724,492 | B2* | 5/2014 | Frank | H04L 5/0035 370/252 |
| 8,773,809 | B2* | 7/2014 | Jin | G11B 27/36 360/31 |
| 8,787,957 | B2* | 7/2014 | Vujcic | H04W 74/0866 370/329 |
| 8,818,744 | B2* | 8/2014 | Martin | G01R 13/0227 702/68 |
| 8,837,572 | B2* | 9/2014 | Chen | H04B 7/0845 327/551 |
| 8,989,113 | B2* | 3/2015 | Mukherjee | H04W 74/0833 370/329 |
| 9,008,249 | B2* | 4/2015 | Wu | H04B 1/1036 342/357.22 |
| 9,301,298 | B2* | 3/2016 | Yokomakura | H04L 5/0026 |
| 9,325,483 | B2* | 4/2016 | Karsi | H04L 5/0073 |
| 9,503,284 | B2* | 11/2016 | Nazarathy | H03H 17/0266 |
| 9,529,017 | B2* | 12/2016 | Martin | G01R 13/0227 |
| 2016/0278127 | A1* | 9/2016 | Sunell | H04W 4/005 |

FOREIGN PATENT DOCUMENTS

| | | |
|---|---|---|
| CN | 103379071 A | 10/2013 |
| WO | 2014082284 A1 | 6/2014 |

* cited by examiner

APPARATUS AND METHOD OF PERFORMING A DECIMATION ON A SIGNAL FOR PATTERN DETECTION

CROSS REFERENCE TO RELATED APPLICATION(S)

The present application claims priority to Romanian Patent Application No. RO A 2015 00414, entitled "APPARATUS AND METHOD OF PERFORMING A DECIMATION ON A SIGNAL FOR PATTERN DETECTION," filed on Jun. 18, 2015, the entirety of which is herein incorporated by reference.

FIELD OF THE INVENTION

The present disclosure relates generally to a reception of orthogonal frequency division multiplexed (OFDM) signals and in particular to communications systems using OFDM to communicate information in a multiple user two-way communication system. More particularly, the present disclosure relates to a receiver supporting Discrete Fourier Transform Spread OFDM transmission (DFTS-OFDM) also referred to as a frequency-domain generalization of Single Carrier Frequency Division Multiple Access (SC-FDMA).

BACKGROUND

A physical random access channel (PRACH) is a contention-based channel that has been implemented in various wireless communication systems for initial uplink (UL) transmission. In general, a particular PRACH implementation is dependent on the technology employed by an associated wireless communication system. For example, depending on the wireless communication system, a PRACH can be used to access a network, request resources, carry control information, adjust a time offset of a UL, and/or adjust transmitted power. As the PRACH is a common channel, the PRACH may experience collisions when different user equipment (UE) attempts to simultaneously utilize the PRACH. In order to help prevent a collision on a message of interest, a system may employ a preamble (which is a short signal that is typically sent prior to a transmission of an associated message) for a PRACH access. That is, a PRACH access may include a transmission of a preamble (that is selected from a set of preambles) and a subsequent transmission of an associated message. In a long-term evolution (LTE) compliant wireless communication system, a PRACH only includes a preamble.

In at least one wireless communication system, a UE may persist in sending a preamble (at least for a predetermined number of times) until the UE receives an acquisition indicator (AI) or a random access response message from a serving base station (BS) that indicates the BS correctly detected the preamble. When a positive AI or a positive random access response message is received by a UE, a subsequent transmission of an associated message is contention free, except where multiple UEs have transmitted the same PRACH signal substantially simultaneously (in which case collision resolution is needed). In a typical system, a UE is informed, via a broadcast channel (BCH), which access slots the UE can use for a PRACH. Typically, before a PRACH access, downlink (DL) power is measured (e.g., from the BCH) and an initial transmit power is computed from the measurement. In a typical wireless communication system, the preamble does not include the identity of a transmitting UE. If a BS successfully detects the preamble, the BS sends back a random access response message that includes a replica of the preamble, an indication, and resources reserved for uplink (UL) transmission if the indication is positive.

A high-speed PRACH in an LTE compliant wireless communication system employs a relatively complex waveform. An LTE PRACH occupies seventy-two tones at 15 kHz in the frequency-domain and a time-period in the time-domain that is based on a format of the PRACH signal. For example, an LTE PRACH signal that employs format '0' has a time duration of about 0.8 ms (milliseconds). Depending on the formats employed, many PRACH waveforms may be possible. In general, PRACH waveform detection at a serving BS has conventionally been highly complex.

There is an ongoing need for a receiver architecture that is adapted for a multiple user communications system that enables the use of band-width efficient transmissions. More particularly, there is a need for an adequate filtering and decimation structure at the OFDM receiver to recover the data from the various sub-channels it receives.

SUMMARY

The present invention provides an apparatus of performing a decimation on a signal for pattern detection, a method of performing a decimation on a signal for pattern detection and a non-transitory, tangible computer readable storage medium bearing computer executable instructions for operating the apparatus of performing a decimation on a signal for pattern detection and/or for carrying out the method of performing a decimation on a signal for pattern detection as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
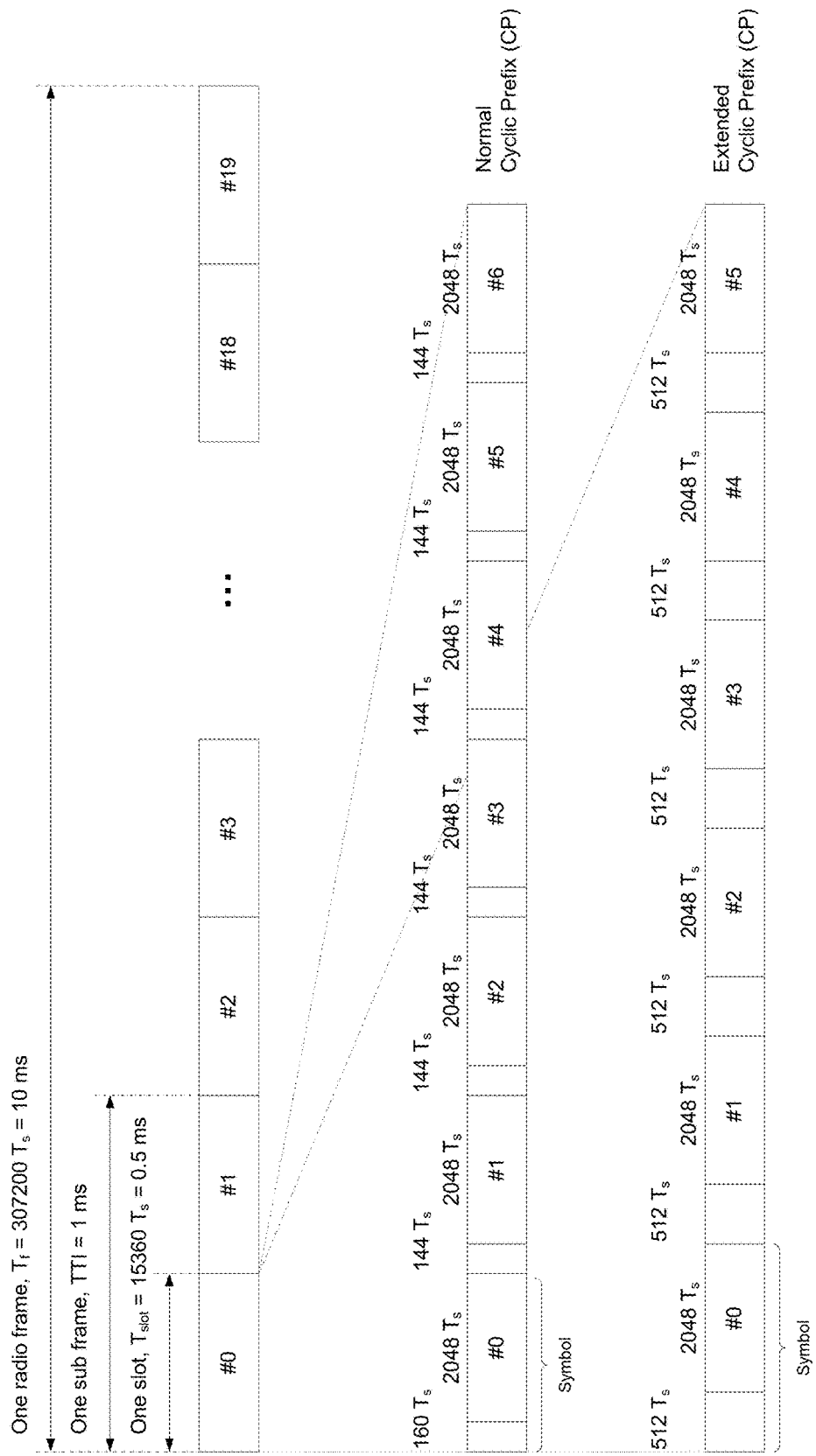
FIG. 1 shows an illustrative radio frame structure for use in a mobile communication network.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

While the discussion herein is generally directed to a long-term evolution (LTE) compliant wireless communication system, it is contemplated that the techniques disclosed herein are applicable to the generation and detection of physical random access channel (PRACH) signals in a variety of different wireless communication systems. As used herein, the term "coupled" includes both a direct electrical connection between blocks or components and an indirect electrical connection between blocks or components achieved using one or more intervening blocks or components. As is also used herein, the term "user equipment" is utilized to broadly denote a wireless communication device and is synonymous with the term "subscriber station".

According to various examples of the present application, techniques are disclosed that reduce the computational costs of the complex PRACH waveform detection. In particular, the computational costs are reduced in that existing computational resources are leveraged to improve the overall efficiency of the PRACH waveform detection. According to the present disclosure, a frequency-domain and time-domain transform components are used for preparing the signal comprising PRACH waveform on which the detection is applied.

In the LTE standard, over the air data communication makes use of the Orthogonal Frequency Division Multiple Access (OFDMA) to efficiently exploit the radio frequency resources in order to reach high data rates and data volumes. In order to meet the targets, LTE makes use of Orthogonal Frequency Division Multiple Access (OFDMA) as downlink modulation scheme whereas Single Carrier-Frequency Division Multiple Access (SC-FDMA) is used as uplink modulation scheme. Single Carrier-Frequency Division Multiple Access (SC-FDMA) is also known as Discrete Fourier Transform Spread Orthogonal Frequency Division Multiple (DFTS-OFDM) Access. LTE further supports Time Division Duplex (TDD) and Frequency Division Duplex (FDD).

The basic idea underlying orthogonal frequency division multiplexing (OFDM) is the division of the available frequency spectrum into several subcarriers. To obtain a high spectral efficiency, the frequency responses of the subcarriers are overlapping and orthogonal. In LTE systems, the OFDMA downlink transmissions and the uplink transmissions are organized into radio frames each with $T_f = 307200 \times T_s = 10$ ms duration, wherein $1/T_s = 30.72$ MHz. The generic frame structure is applicable to both frequency division duplex (FDD) and time division duplex (TDD). As shown in FIG. 1, each radio frame is $T_f = 307200 \times T_s = 10$ ms long and consists of 20 slots of length $T_{slot} = 15360 \times T_s = 0.5$ ms, numbered from #0 to #19. A sub-frame is defined as two consecutive slots where sub-frame i consists of slots 2i and 2i+1. Hence, each sub-frame has a transmission time interval (TTI) of 1 ms in duration. For FDD, 10 sub-frames are available for downlink transmission and 10 sub-frames are available for uplink transmissions in each 10 ms interval. Uplink and downlink transmissions are separated in the frequency domain. For TDD, a sub-frame is either allocated to downlink or uplink transmission, wherein sub-frame #0 and sub-frame #5 are always allocated for downlink transmission.

A slot comprises either 6 or 7 OFDM symbols in dependence of whether normal cyclic prefix (CP) or extended cyclic prefix is used. In case of normal CP, the first OFDM symbol #0 comprises a CP portion of $160 \times T_s$ in duration and the following 6 OFDM symbol #1 to #6 each comprise a CP portion of $144 \times T_s$ in duration. Each OFDM symbol #0 to #6 comprises a data payload portion of $2048 \times T_s$ in duration. Hence, $T_{slot} = 0.5$ ms $= 15360 \times T_s [(160+2048) \times 1 + (144+2048) \times 6] \times T_s$. In case of extended CP, each OFDM symbol #0 to #6 comprises a CP portion of $512 \times T_s$ and a data payload portion of $2048 \times T_s$. Hence, $T_{slot} = 0.5$ ms $= 15360 \times T_s = [(512+2048) \times 6] \times T_s$.

For the sake of completeness it should be noted that LTE supports different number of sub-carriers in frequency domain. The total number of sub-carriers depend on the used overall transmission bandwidth. In LTE the bandwidths as shown in the following table are supported:

|  | Channel Bandwidth [MHz] | | | | | |
| --- | --- | --- | --- | --- | --- | --- |
|  | 1.4 | 3 | 5 | 10 | 15 | 20 |
| Number of Resource Block | 6 | 15 | 25 | 50 | 75 | 100 |
| Number of subcarriers | 72 | 180 | 300 | 600 | 900 | 1200 |
| FFT size (Rx) | 128 | 256 | 512 | 1024 | 1536 | 2048 |
| Sampling frequency [MHz] | 1.92 | 3.84 | 7.68 | 15.36 | 23.04 | 30.72 |
| Samples per slot | 960 | 1920 | 3840 | 7680 | 11520 | 15360 |

Figure 2:
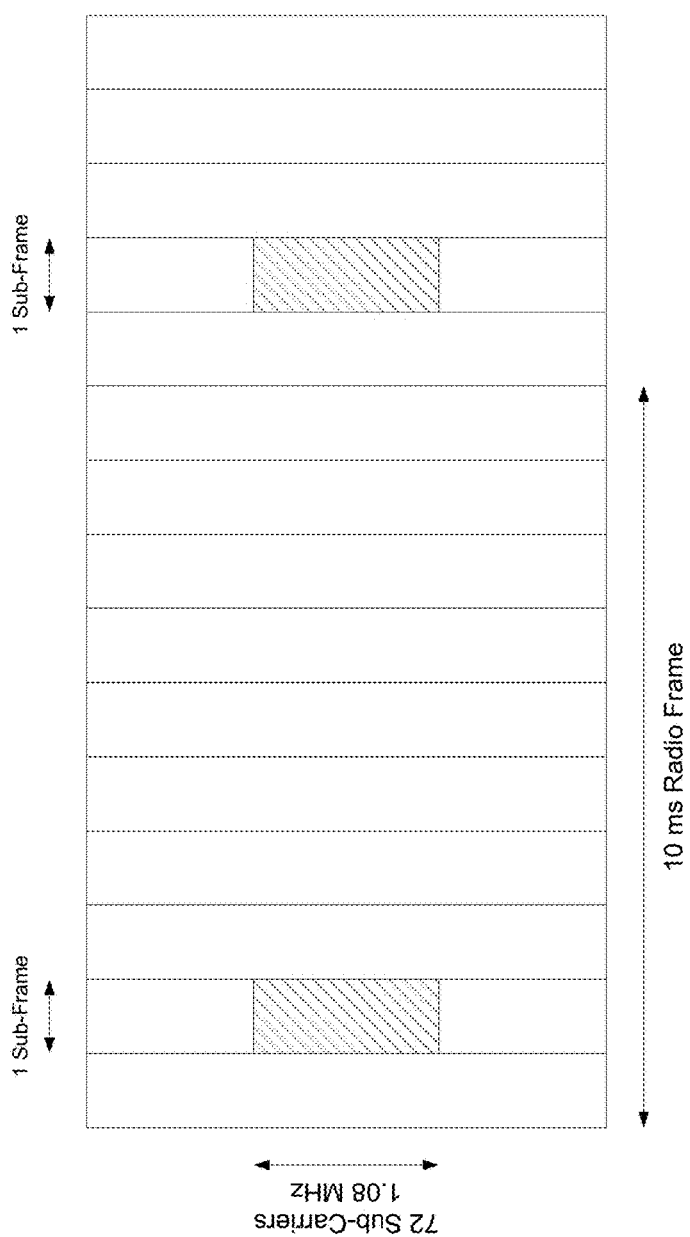
FIG. 2 shows an illustrative up-link time/frequency allocation for use in a mobile communication network.
Figure 3:
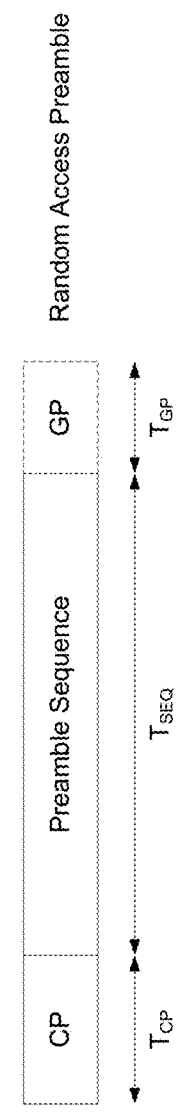
FIG. 3 schematically illustrates a non-synchronized physical random access channel (PRACH) preamble structure in time domain for use in the uplink transmission of FIG. 2.
Figure 4:
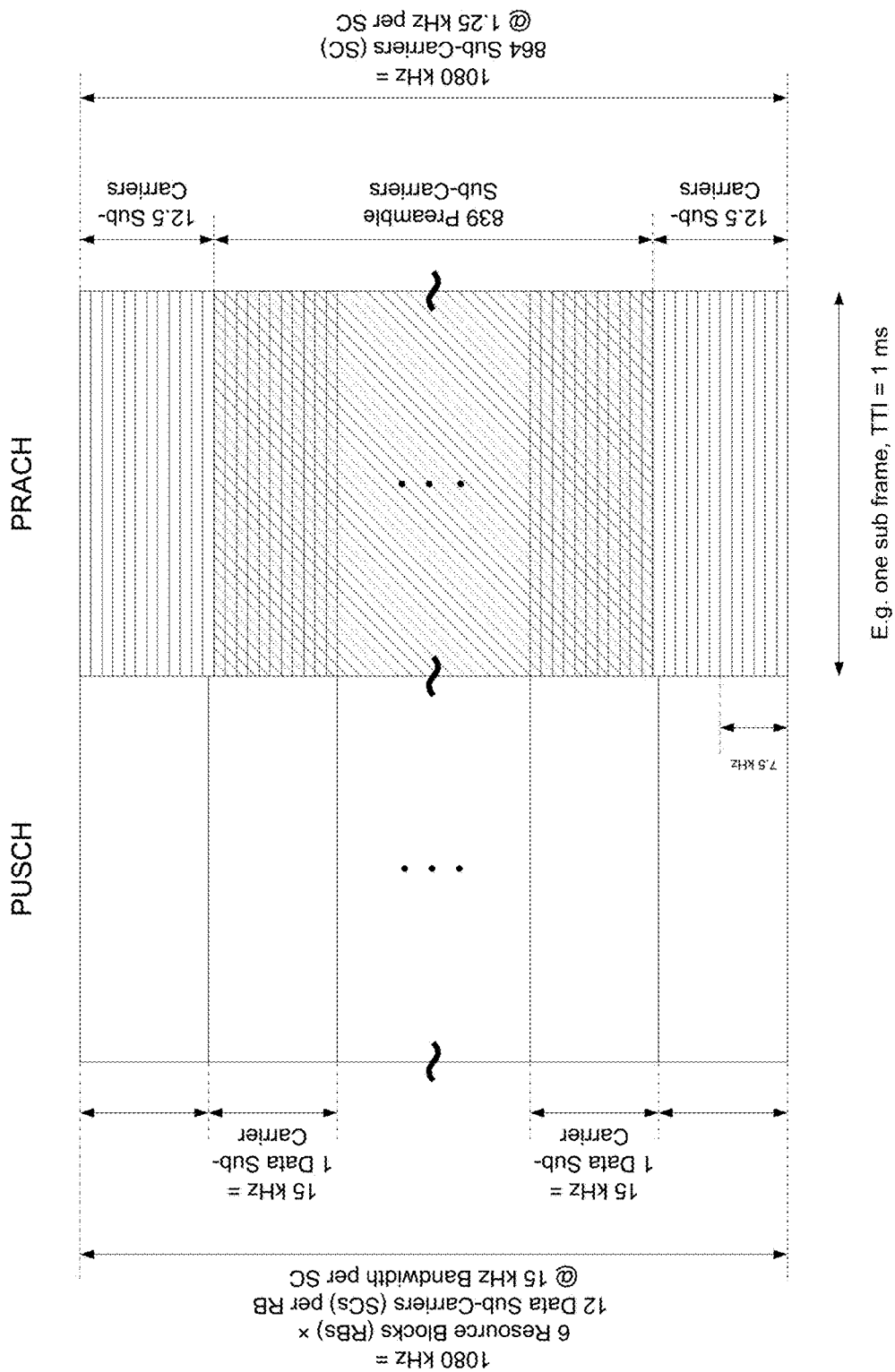
FIG. 4 schematically illustrates the PRACH preamble structure in frequency domain for use in uplink transmission of FIG. 2.

FIGS. 2 to 4 schematically illustrate a physical random access channel (PRACH) and the PRACH preamble structure in frequency and time domain for use in uplink transmission.

Downlink or uplink transmissions are assigned to uplink and downlink channels, which are further divided into data channels, random access channels, broadcast channels, paging channels, signaling channels, control channels, and the like in accordance with a purpose. The uplink and downlink channels may be shared or dedicated.

Mobile equipment may initiate communication with the base station by transmitting a message on one or more of the so-called random access channels (RACHs). Uplink random access messages are non-synchronized and therefore may be transmitted at any time relative to the synchronized downlink timing by any mobile equipment within the coverage area of the base station. The receiver in the base station therefore continuously monitors the random access channels and search the signals received on the random access channels for predetermined sequences of symbols (sometimes referred to as the RACH preamble) in random access messages transmitted by a mobile equipment. To make the search process feasible, the format of the random access messages is typically standardized. For example, conventional random access messages in LTE systems are transmitted in a sub-frame during a transmission time interval (TTI) of 1 ms in 1.08 MHz bandwidth on the so-called Physical Random Access Channel (PRACH) as schematically illustrated in FIG. 2.

FIG. 2 illustrates an exemplary up-link transmission frame, and the allocation of the frame to scheduled and random access channels. The illustrative up-link transmission frame comprises a plurality of transmission sub-frames. A selected number of sub-frames should be considered to be reserved for scheduled UE up-link transmissions. Interspersed among scheduled sub-frames, are time and frequency resources allocated to random access channels. In the illustration of FIG. 2, a single sub-frame supports one random access channel. Note that the illustrated number and spacing of random access channels is purely a matter of convenience; a particular transmission frame implementation may allocate more or less resource to random access channels. Including multiple random access channels allows more UEs to simultaneously transmit a random access signal without collision.

Referring now to FIG. 3, the PRACH preamble in time domain has three parts including a cyclic prefix (CP) with length $T_{CP}$, a signature or sequence part with length $T_{SEQ}$ and with a guard period $T_{GP}$. The cyclic prefix is added to substantially eliminate Inter-Symbol Interference (ISI) and the guard period is an unused part at the end of the preamble used allowing for compensating propagation delay. According to TS 36.211 (v12.5.0), LTE uses four different preamble formats for FDD operation and one for TDD operation; cf. table 5.7.1-1.

| Preamble format | Allocated sub-frames | $T_{CP}$ | $T_{SEQ}$ | $T_{GP}$ |
|---|---|---|---|---|
| 0 | 1 Δ 1 ms | 3168 $T_s$ ≈ 103.13 μs | 24576 $T_s$ = 0.8 ms | ≈96.87 μs |
| 1 | 2 Δ 2 ms | 21024 $T_s$ ≈ 684.38 μs | 24576 $T_s$ = 0.8 ms | ≈515.62 μs |
| 2 | 2 Δ 2 ms | 6240 $T_s$ ≈ 203.13 μs | 2 · 24576 $T_s$ = 1.6 ms | ≈196.87 μs |
| 3 | 3 Δ 3 ms | 21024 $T_s$ ≈ 684.38 μs | 2 · 24576 $T_s$ = 1.6 ms | ≈715.62 μs |
| 4 (see Note) | 1 | 448 $T_s$ | 4096 $T_s$ | |

NOTE:
Frame structure type 2 and special sub-frame configurations with UpPTS lengths 4384 $T_s$ and 5120 $T_s$ only.

The structure of PRACH is designed to fit one, two or three radio sub-frames in time domain and 6 Resource Blocks in the frequency domain in accordance with the predefined preamble format. It should be noted that the time structure of PRACH differs from the OFDM symbol time structure of a slot as described with reference to FIG. 1.

In the physical random access channel (PRACH), cyclic-shifted versions of Zadoff-Chu (ZC) sequences are adapted as preambles. The Zadoff-Chu (ZC) sequences are so-called well-known constant amplitude and zero autocorrelation (CAZAC) sequences. According to chapter 5.7.2 of TS 36.211 (v12.5.0), the preambles $x_{u,v}(k)$ of the physical random access channel are formed from a CAZAC sequence generated by cyclic shifting of an u-th root Zadoff-Chu (ZC) sequence $x_{u,v}(k)$ of length $N_{ZC}$, where $N_{ZC}=839$, by a multiples v of $N_{CS}$, i.e., $$x_{u,v}(k) = x_u((k+C_v) \bmod N_{ZC}),$$

where the cyclic shift $C_v$ is given by $$C_v = \begin{cases} vN_{Cs} & v = 0, 1, \ldots, \left\lfloor \frac{N_{ZC}}{N_{CS}} \right\rfloor - 1, \\ & N_{CS} \neq 0 \quad \text{for unrestricted sets} \\ 0 & N_{CS} = 0 \quad \text{for unrestricted sets} \\ d_{start}\left\lfloor \frac{v}{n_{shift}^{RA}} \right\rfloor + & v = 0, 1, \ldots, \\ (v \bmod n_{shift}^{RA})N_{CS} & n_{shift}^{RA} n_{group}^{RA} + \bar{n}_{shift}^{RA} - 1 \quad \text{for restricted sets} \end{cases}$$

and the u-th root Zadoff-Chu (ZC) sequence $x_u(k)$ is defined by $$x_u(n) = e^{\frac{-j\pi un(n+1)}{N_{ZC}}}, \quad n = 0, \ldots, N_{ZC} - 1$$

The values of $N_{CS}$ are pre-defined for different configurations; see for instance tables 5.7.2-2 and 5.7.2-3 of TS 36.211 (v12.5.0).

It should be noted that one benefit of the CAZAC property is that is allows multiple orthogonal sequences to be generated form the same root ZC sequence. If the periodic autocorrelation of a ZC sequence provides a single peak at zero lag, the periodic correlation of the same sequence against a cyclic shifted replica provides a peak at lag $N_{CS}$, which is the number of samples of the cyclic shift. Accordingly, a zero-correlation zone (ZCZ) is obtained between these two sequences. As long as the ZCZ is dimensioned to cope with the larges possible expected time misalignment between two sequences, these two sequences are orthogonal for all transmission within the time misalignment. The cyclic shift $N_{CS}$ is selected to ensure orthogonality regardless of the delay spread and time uncertainty of the UEs within the coverage of a serving BS.

The basic frequency resource unit in LTE systems is called Resource Element (RE), which consists of one OFDM sub-carrier in one of the 6 or 7 ODFM symbols carried by a slot. Each OFDM sub-carrier is spaced 15 kHz apart from each other. In the frequency domain, these sub-carriers are aggregated into groups of 12 consecutive sub-carriers (SC) in order to form a Resource Blocks (RBs). Each Resource Block (RB) occupies a bandwidth of 180 kHz in one slot duration. A Resource Block represents the smallest resource unit assignable by a scheduler for transmissions.

Referring now to FIG. 4, Physical Uplink Shared Channel (PUSCH) structure illustrates 72 sub-carriers that are for each 15 kHz when the frequency resources are allocated to PUSCH, while the Physical Random Access Channel (PRACH) preamble structure illustrates 864 sub-carriers that are each 1.25 kHz when the frequency resources are allocated to PRACH. The sub-carrier spacing at 1.25 kHz is different from other uplink channels. The PRACH occupies a bandwidth of 1.08 MHz that is equivalent of 6 Resource Blocks (RBs) each comprising 12 sub-carriers (SC). The preamble sequence, i.e. the $N_{ZC}$=839 points generated as described above, is positioned at the center of the 1.08 MHz bandwidth so that there is a guard band 15.625 kHz corresponding to 12.5 sub-carriers on each side of the preamble sequence. These guard bands are added to minimize interference from PUSCH. Corresponding to the sub-carrier spacing of 1.25 kHz, the PRACH sub-carrier space is designed to be 12 times less than downlink OFDMA and uplink SC-FDMA.

Figure 5:
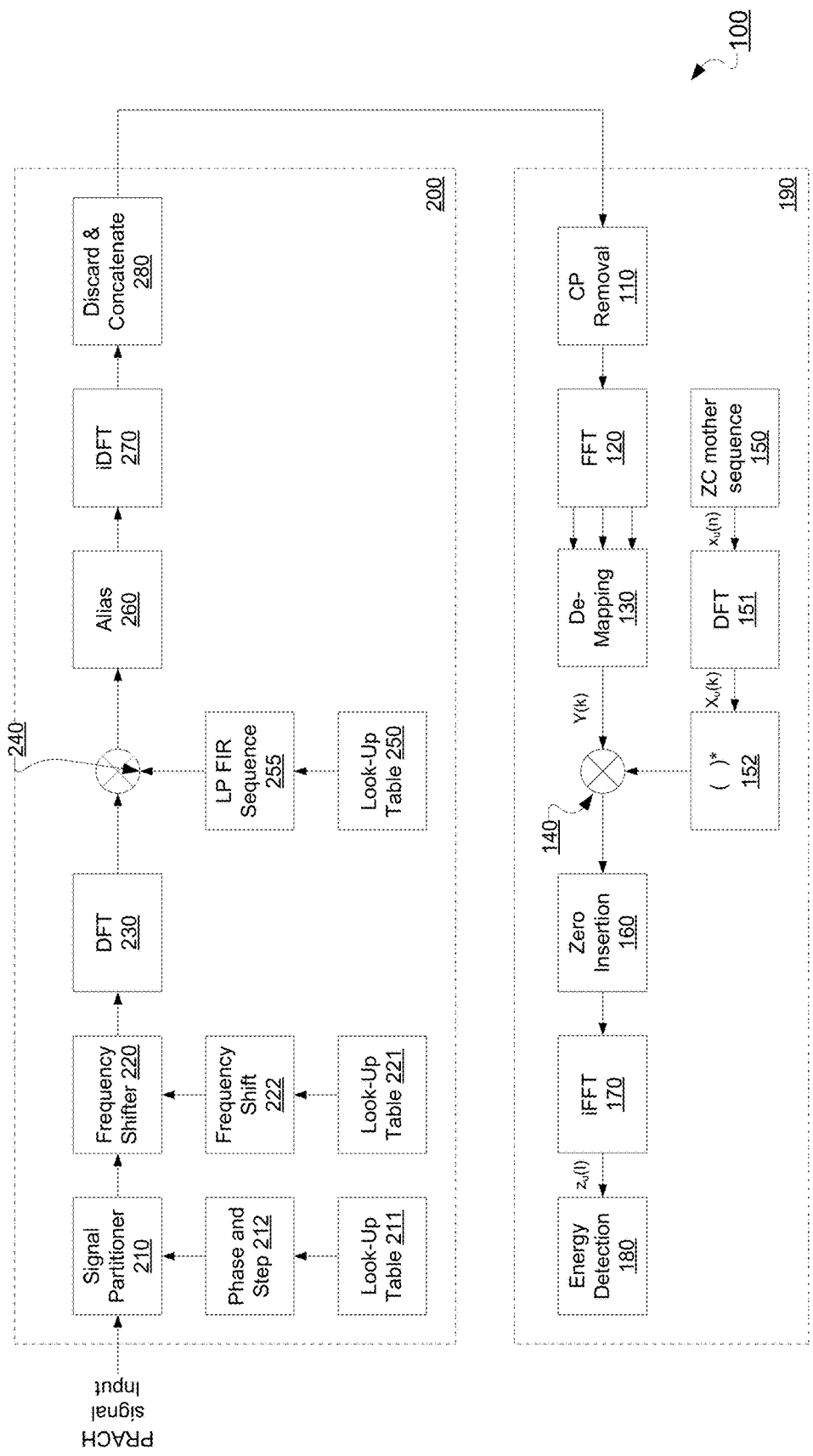
FIG. 5 schematically illustrates a block diagram of a receiver for receiving the preamble of FIGS. 3 and 4 according to an example of the present invention.

Referring now to FIG. 5, a schematic block diagram of a PRACH receiver 100 according to an example of the present application is illustrated.

The received PRACH signal, comprising cyclic prefix and PRACH preamble signal, is input to a decimator component 200, which comprises components arranged to shift the frequency of the inputted PRACH signal, to apply a digital low-pass filter to the frequency shifted PRACH signal and to digitally decimate the filtered PRACH signal. In particular, the decimator component 200 is arranged to shift the inputted PRACH pass-band signal to base-band. More particularly, the decimator component 200 is arranged to apply the digital low-pass filter and to perform the decimation, e.g. by a decimation factor of 12 according to the 1.25 kHz sub-carrier spacing, in frequency domain. The low-pass filter is provide to avoid aliasing in the decimated PRACH signal after downsampling/decimation.

The decimated PRACH signal resulting from the decimator component 200 is fed into a pattern detector component 190, which comprises inter alia a cyclic prefix (CP) removal block 110, a frequency-domain transform component (FFT) 120, a sub-carrier de-mapping component 130, a mixer/product component 140, zero-insertion component 160, a time-domain transform component (iFFT) 170 and an energy detection component 180.

The cyclic prefix (CP) removal block 110 is arranged to remove the cyclic prefix from the frequency-shifted and decimated PRACH signal. The cyclic prefix (CP) removal block 110 may be directly coupled to the decimator component 200 for receiving the frequency-shifted and decimated PRACH signal therefrom.

The frequency-domain transform component (FFT) 120 may directly couple to the cyclic prefix (CP) removal component 110. The frequency-domain transform component (FFT) 120 is arranged to convert the CP stripped PRACH signal outputted by the cyclic prefix (CP) removal component 110 into sub-carrier mapped frequency tones. A sub-carrier de-mapping component 130 is coupled to the frequency-domain transform component FFT 120. The sub-carrier de-mapping component 130 is arranged to de-map sub-carrier mapped frequency tones to extract the frequency-transformed PRACH sequence from the output of the frequency-domain transform component (FFT) 120. The extracted frequency-transformed PRACH sequence Y(k) is supplied to the mixer or product component 140, which is coupled to the sub-carrier de-mapping component 130 and further to a reference sequence generator block 155.

The reference sequence generator block 155 supplies a frequency-transformed reference sequence to be multiplied with the extracted frequency-transformed PRACH sequence Y(k) to the product component 140. The frequency-transformed preamble reference sequence is based on a corresponding set of pilot frequency tones obtained from a Zadoff-Chu root sequence.

According to an example of the present invention, the reference sequence generator component 155 comprises a frequency-domain transform component DFT 151, to a root sequence resampling component 150 is coupled. The root sequence resampling component 150 is arranged to generate a u-th Zadoff-Chu (ZC) root sequence $x_u(n)$ with length $N_{ZC}$=839 in time domain using the PRACH root index u, which has been broadcast to the user equipment by the serving base station. The generated u-th Zadoff-Chu (ZC) root sequence $x_u(n)$ is supplied to the frequency-domain transform component DFT 151, which is arranged to convert the u-th Zadoff-Chu (ZC) root sequence $x_u(n)$ into a set of pilot frequency tones $X_u(k)$=FFT($x_u(n)$, 839). A conjugation component 152 is further coupled to the frequency-domain transform component DFT 151 and arranged to generate a complex conjugation $X_u^*(k)$ of the set of pilot frequency tones. The complex conjugated set of pilot frequency tones $X_u^*(k)$ is supplied to the product component 140 for being multiplied with the extracted frequency-transformed PRACH sequence Y(k).

The product component 140 is arranged to determine a tone by tone complex multiplication of the extracted frequency-transformed PRACH sequence Y(k) with the complex conjugated set of pilot frequency tones $X_u^*(k)$ to produce a set of multiplied frequency tones Y(k)·$X_u^*(k)$ representative of a cross-correlation in the time domain. The set of product values is fed into a zero-insertion component 160, coupled to the product component 140. The zero-insertion component 160 is arranged to pad zeros to the inputted set of multiplied frequency tones Y(k)·$X_u^*(k)$. The time-domain transform component (iFFT) 170 is coupled to the zero-insertion component 160. The time-domain transform component (iFFT) 160 is arranged to convert the set of multiplied frequency tones Y(k)·$X_u^*(k)$ into a correlated time signal samples $z_u(l)$=iFFT(Y(k)·$X_u^*(k)$). The correlated time signal samples $z_u(l)$ contains concatenated power delay profiles of the cyclic shift replicas of the preamble root sequence $x_u(n)$. The energy detection component 180 is coupled to the time-domain transform component (iFFT) 170 and arranged to identify received preamble sequences by detecting the time of peak correlation between received schedule request signal and preamble root sequence $x_u(n)$.

In an example of the present application, the resource and computing efficiency of the above described PRACH receiver 100 is improved by performing the signal decimation of the inputted PRACH signal is the frequency domain making use of hardware accelerators including in particular frequency domain transforming and time domain transforming components.

The decimator component 200 according to an example of the present application will be described in detail in the following. As described above, the decimator component 200 is arranged to downsample or decimate the inputted PRACH signal by decimation factor 12 and apply a low-pass filter to avoid aliasing due to the downsampling or decimation of the inputted PRACH signal.

The low-pass filtering and the decimation is arranged to be operated in the frequency domain. In order to handle the number of samples of the 0.8 ms or 1.6 ms PRACH preamble sequence, the so-called overlap and save method is used to allow for applying low-pass filtering and decimation in frequency domain. In particular, the overlap and save method is applicable to perform filtering operations in frequency domain on a sample sequence having a number of samples exceeding the size of the frequency domain transforming component. The suggested low-pass filtering and the decimation in frequency domain addresses the need of an efficient and flexible methodology using available hardware accelerators.

It is known in the art that linear filtering of a signal in the time domain with a finite impulse response (FIR) filter is a linear convolution process. It is also known that the convolution of two signals can be performed by multiplying the frequency-domain transform of one signal with the frequency-domain transform of the other and then taking the (inverse frequency) time-domain transform of the product spectrum. By performing the convolution with a Discrete Fourier Transform (DFT) method such as an FFT one can significantly reduce the workload per output point. The method of performing convolution via a DFT is often referred to as Fast Convolution. However, normal convolution is a continuous process whereas a DFT and Fast Convolution is a block process that partitions the data into blocks. Multiplying the DFT calculated frequency spectra of two sequences following by an inverse DFT of the product spectrum is identical to the circular convolution of the two sequences. Circular convolution suffers from aliasing effects due to circular wrap-around. In this case there will be $N_h-1$ data points that will undergo circular wrapping where $N_h$ is the number of coefficients of filter function h. Care must be taken to avoid artifacts due to the block boundaries.

The decimator component 200 comprises a signal partitioner component 210, to which the received PRACH signal is inputted. The signal partitioner component 210 is arranged to partition the PRACH signal starting at an initial sample of the received PRACH signal into overlapping signal input blocks. The initial sample and partitioning width configuration 212 to be applied by the signal partitioner component 210 on the inputted PRACH signal may be retrieved from a look-up table 211, which is arranged to store a set of configuration records each including initial sample and partitioning width configuration for a respective PRACH format.

The input signal blocks are fed into successively fed into a frequency shifter component 220, which is coupled to the signal partitioner component 210. The PRACH signal may be transmitted by an UE at one of a predefined number of frequency allocations. The frequency shifter component 220 is provided to apply a 7.5 kHz frequency shift to compensate the 12.5 sub-carrier guard and/or the frequency shift depending on the used frequency allocation to shift the inputted PRACH signal to zero center frequency. The frequency shifter component 220 is arranged to shift the frequency of the input signal blocks by a predefined frequency shift value. An initial phase and the frequency shift configuration 222 to be applied by the frequency shifter component 220 on the inputted PRACH signal may be retrieved from a look-up table 222, which is arranged to store a set of configuration records each including initial phase and the frequency shift configuration for a respective PRACH. The frequency shifter component 220 may apply a complex multiplication on the samples of the input signal blocks. The frequency shift configuration 222 may comprise a number of complex shift values equal to the number of samples of an input signal block. Each samples is complex multiplied with a respective one of the complex shift values. The complex shift values to be applied to obtain a desired frequency shift of the input signal blocks may be pre-calculated and stored in the look-up table 211 for being retrieved therefrom based on the required frequency shift to be applied to the input signal blocks.

The input signal blocks are successively fed into a frequency-domain transform component such as Discrete Fourier Transform (DFT) component 230 coupled to the frequency shifter component 220. The Discrete Fourier Transform (DFT) component 230 is arranged to convert each supplied signal input block into a frequency-mapped signal block. The frequency-mapped signal block generated by the Discrete Fourier Transform (DFT) component 230 is supplied to a mixer 240, which is coupled to the Discrete Fourier Transform (DFT) component 230 and arranged to multiply the frequency-mapped signal block with a low-pass FIR (frequency Impulse Response) filter sequence having the same length like the frequency-mapped signal block. The low-pass FIR (frequency Impulse Response) filter sequence to be applied may be retrieved from a look-up table 250, which is arranged to store a set of pre-computed low-pass FIR (frequency Impulse Response) filter sequences. The mixer 240 outputs a spectral product block comprising a sequence of spectral product samples, which is fed into an aliasing component 260 coupled thereto.

The low-pass FIR (Frequency Impulse Response) filter may be designed to have a stop-band, which when applied to the respective spectral samples of the frequency-mapped signal block results to product spectral samples exceeding the working precision of the digital value representation used in the frequency domain part of the decimator component 200 for representing the values of the spectral samples. For instance, an N-bit fractional fixed point representation may be used for numerical representing the spectral samples of the frequency-mapped signal block and the filter sequence. Any values below the minimum representable value limit of the N-bit fractional fixed point representation may be set to or consider as zero values. Accordingly, multiplications, which exceeds the working precision of the used digital value representation, may be omitted and the multiplication results are considered to be zero values and the respective spectral values of the product spectral sequence are accordingly set.

The aliasing component 260 is arranged to coherently add aliasing blocks of the obtained spectral product block. The aliasing blocks are obtained by partitioning the product spectrum into parts of equal size. By coherently adding the aliasing blocks, a downsampling/decimation of the signal represented by the input signal blocks by a factor D corresponding to the number of aliasing blocks is achieved. The coherently adding performed by the aliasing component 260 may be also designated as (coherently) summing or wrapping. The coherently adding the aliasing blocks results to an aliased sample block with length reduced by factor D with respect to the length of the inputted spectral product block.

The aliasing component 260 may be further arranged to consider parts of the spectral product block, which comprise or are considered to comprise only zero product values because of the stop-band part of the low-pass FIR filter is designed to exceed the working precision with respect to the used digital value representation. Aliasing blocks of the product spectrum, which are considered to comprise only zero values, are omitted in the coherently adding operation. Only aliasing blocks of the product spectrum, which comprises non-zero values, are coherently added. Provided that the positions of the non-zero values in the aliasing blocks do not overlap, i.e. two or more aliasing blocks comprise non-zero product spectral sample values at position ranges within the aliasing blocks, each position range of which does not overlap with any other position ranges, the coherently adding operation may be reduced to a copying operation of the product spectral samples of the respective ranges into the resulting aliased sample block.

The aliased sample block is supplied to a time-domain transform component such as an inverse Discrete Fourier Transform (iDFT) component 270 coupled to the aliasing component 260 and arranged to convert the aliased sample block back to time domain. The time mapped aliased sample block represents an output block of the processing in frequency domain. The output block corresponds to the signal input block obtained by partitioning the inputted PRACH sequence. In order to obtain a decimated PRACH sequence, the output blocks each corresponding to one of the signal input blocks are recomposed to form the decimated PRACH sequence by the discarding and concatenating component 280 coupled to the inverse Discrete Fourier Transform (iDFT) component 270. The discarding and concatenating component 280 is arranged to discard samples in the output block, which suffer from aliasing corruption. The remaining part of the output blocks are concatenated. The concatenated parts of the output blocks form the decimated PRACH sequence to be further processed for preamble detection as described above.

Figure 6:
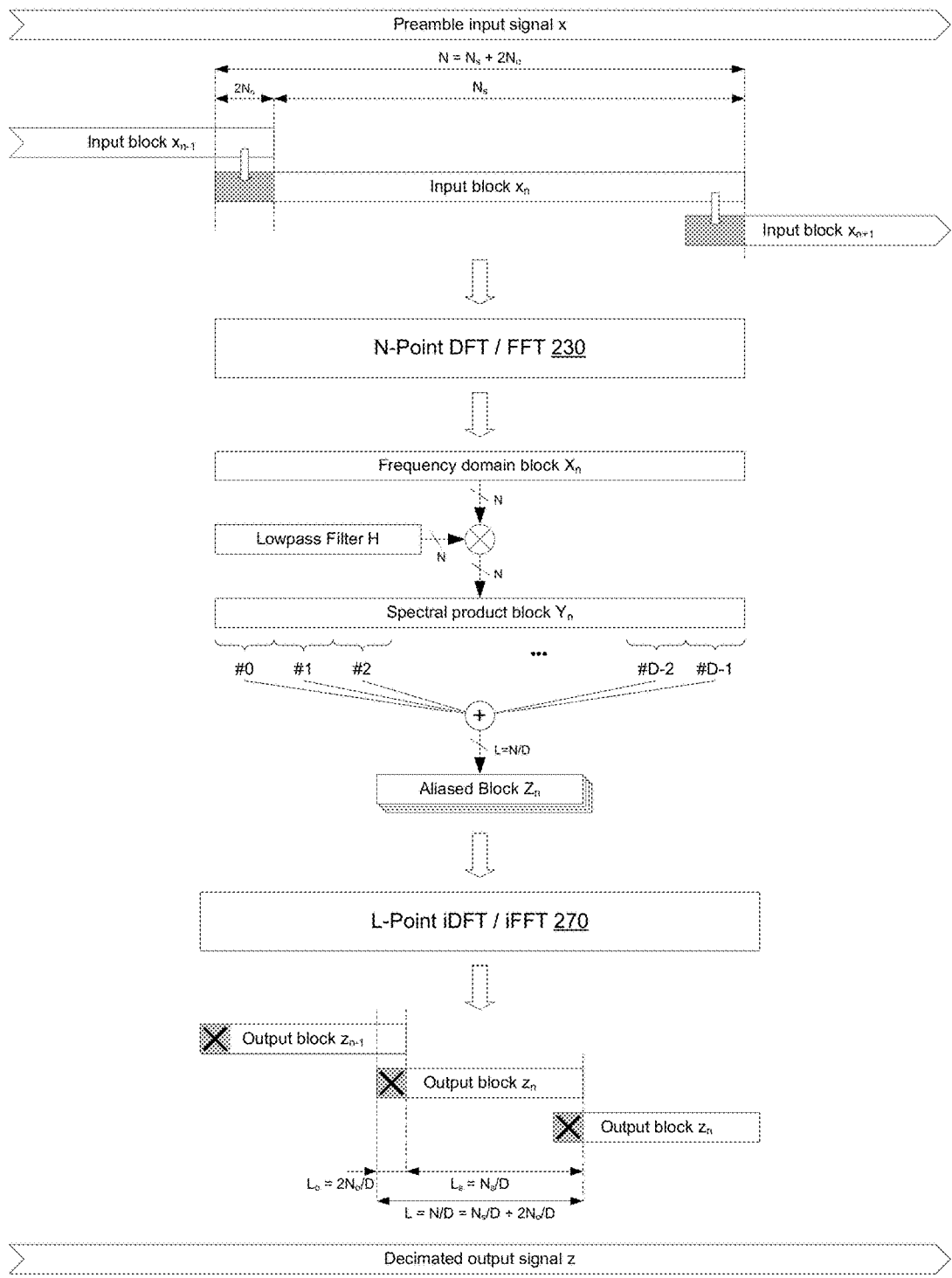
FIG. 6 shows a schematic flow diagram illustrating the signal processing at a frequency domain signal decimator used in the receiver of FIG. 5 according to an example of the present invention.
Figure 7:
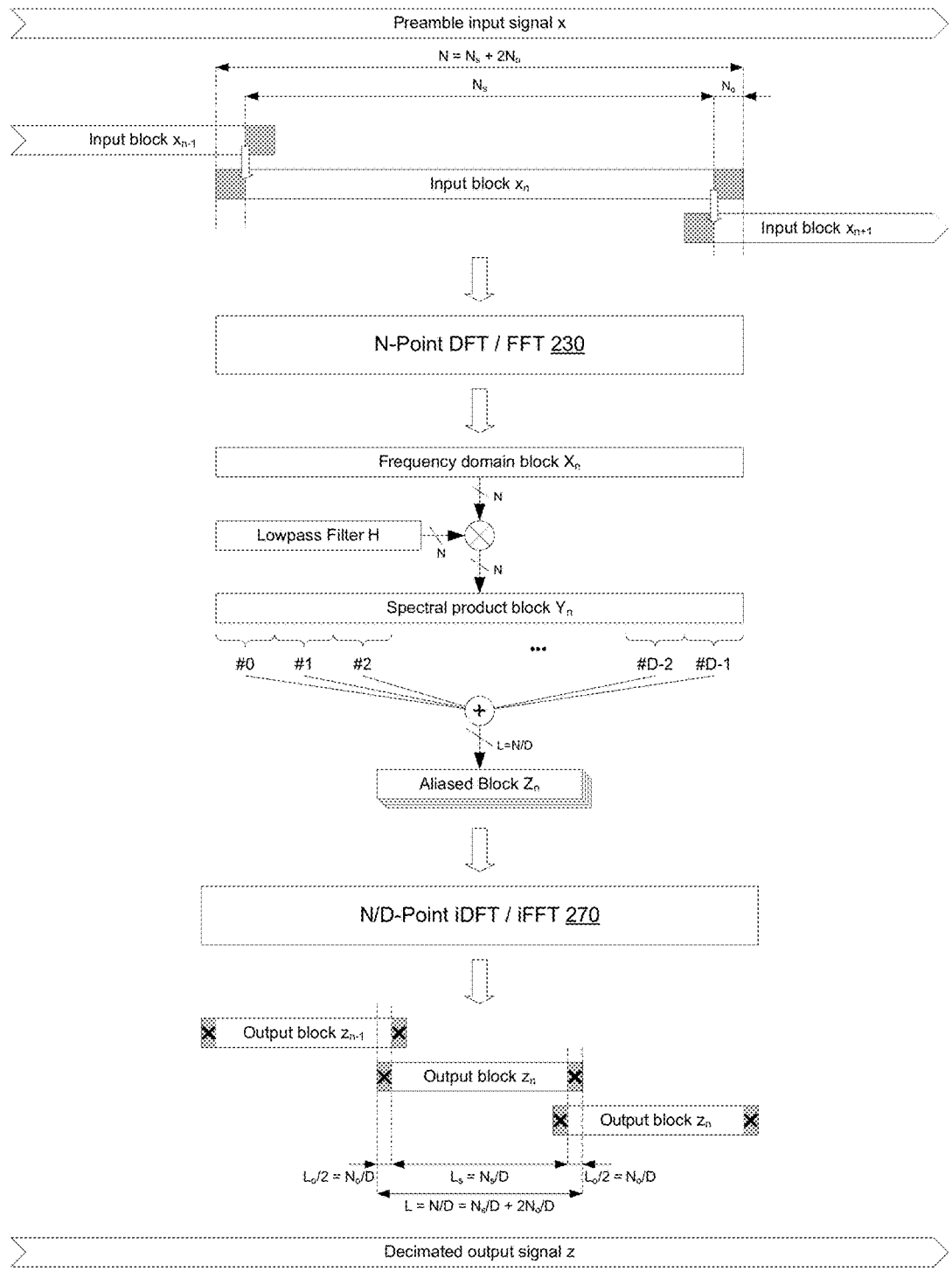
FIG. 7 shows another schematic flow diagram illustrating the signal processing at a frequency domain signal decimator used in the receiver of FIG. 5 according to an example of the present invention.

The functionality of the components of the decimator component 200 will be more fully understood with reference to FIGS. 6 and 7 schematically illustrating a signal diagram of an example of a decimator component 200 accord to the present application.

Referring now to FIG. 6, the processing of the inputted PRACH sequence in time and frequency domain is schematically illustrated on the basis of an exemplary signal diagram exemplifying the signal flow and processing.

The inputted PRACH sequence is represented by the PRACH preamble input signal x, which is partitioned into a predefined number M of input blocks $x_n$, where $n=0, \ldots, M-1$. All input blocks are of the same length N and contain sequential samples from the inputted PRACH sequence x. Each input block $x_n$, $n>1$ overlaps with the previous input block $x_{n-1}$. This means that first $2N_0$ samples of the input block $x_n$, $n>1$ are the same as the last $2N_0$ samples of the input block $x_{n-1}$. Hence, each input block $x_n$ comprises $N=N_s+2N_0$ sequential samples with $N_s$ new sequential samples and an overlap of $2N_0$ samples. There is not a previous input block for the first input block $x_1$. The first $2N_0$ samples of the input block $x_1$ is padded with $2N_0$ zeros.

This means:

$$x_1(n) = \{0,0,\ldots,0,x(0),x(1),\ldots,x(N_s-1)\}$$

$$x_2(n) = \{x(N_s-2N_0),\ldots,x(N_s-1),x(N_s),\ldots,x(2N_s-1)\}$$

$$x_3(n) = \{x(2N_s-2N_0),\ldots,x(2N_s-1),x(2N_s),\ldots,x(3N_s-1)\}$$

etc.

The last $2N_0$ samples from the previous input block $x_{n-1}$ are saved for use in the current input block $x_n$.

Each input block is sequentially supplied to the N-point DFT component 230, which converts the input block $x_n$ into a frequency-mapped input block $X_n = DFT(x_n, N)$ comprising spectral samples $X_n(k)$.

The low-pass (LP) finite impulse response (FIR) filter to be applied is provided in form of a frequency-mapped LP FIR filter sequence H(k). In case the number of filter coefficient is smaller than the length N of the frequency-mapped input block $X_n$, the LP FIR filter sequence h is zero patted in the time domain to the length N and converted by an N-point DFT into frequency domain to obtain H(k), $k=0, \ldots, N-1$. The frequency-mapped input block $X_n$ is multiplied with the frequency-mapped LP FIR filter sequence H to obtain a spectral product sequence $Y_n(k)$ with length N, where $Y_n(k) = X_n(k) \cdot H(k)$, $k=0, \ldots, N-1$.

In an example of the present application, the stop-band of the low-pass (LP) finite impulse response (FIR) filter is designed to attenuate the spectral samples of the frequency-mapped input block $X_n$ below the minimum representable value of the used digital value representation. Accordingly, the multiplications of the spectral samples of the frequency-mapped input block $X_n$ in the frequency range of the stop-band can be omitted and replaced by setting the respective spectral product samples of the spectral product sequence $Y_n(k)$ to zero value. Hence, the number of multiplications is significantly reduced.

The spectral product block $Y_n$ is further partitioned into D aliasing blocks $Y_n^{(l)}(k)$, where $l=0, \ldots, D-1$, having the same length $L=N/D$, $k=0, \ldots, N/D-1$, and the aliasing blocks $Y_n^{(l)}(k)$ are coherently added to obtain an aliased block $Z_n$ with length $L=N/D$.

As already mentioned above, the number of parts to be coherently added may be reduced in case the spectral product block $Y_n$ comprises spectral product sample sequences of zero value, which results to aliasing blocks $Y_n^{(l)}(k)$ only comprising spectral product samples of zero values, which is the case when applying a LP FIR filter sequence H(k) to the frequency-mapped input block $X_n$, which attenuates the spectral samples of the frequency-mapped input block $X_n$ to values exceeding the used working precision, e.g. falling below the minimum representable value limit of the used digital value representation. Accordingly, only aliasing blocks $Y_n^{(l)}(k)$ are coherently added, which comprise spectral product samples with non-zero values. In an example of the present application, the LP FIR filter sequence H(k) is designed such that only a first and a last aliasing block of the spectral product sequence $Y_n$ comprises spectral product samples with non-zero values. Accordingly, the number of coherent adding operations is significantly reduced.

In an example of the present application, the first and a last aliasing block of the spectral product sequence $Y_n$ may comprises spectral product samples with non-zero values in non-overlapping differing position ranges. E.g. the first aliasing block may comprise spectral product samples with non-zero values in the first half thereof and the second aliasing block may comprise spectral product samples with non-zero values in the second half thereof. The respective halves of the first and a last aliasing block are concatenated to obtain the resulting aliased block $Z_n$:

$$Z_n(k) = \{Y_n^{(1)}(0), \ldots, Y_n^{(1)}(L/2-1), Y_n^{(D-1)}(L/2), \ldots, Y_n^{(D-1)}(L-1)\},$$

where $k=0, \ldots, L-1$.

Next, the aliased block $Z_n$, which forms a frequency-mapped output block, is converted back into time domain by the L-point inverse DFT component, which sequentially outputs an output block $z_n$ of length $L=N/D$ for each sequentially inputted input block $x_n$, $n=0, \ldots, M-1$. Each output block $z_n$ overlaps by $L_O=2N_0/D$ samples with the previous output block $z_{n-1}$. The first $2N_0/D$ samples are discarded and the remaining $L_s=N_s/D$ samples of the output blocks $z_n$ are sequentially concatenated to form the output sequence z, which is herein the decimated PRACH sequence decimated by factor D. The decimated PRACH sequence comprises a number of samples, which is reduced by the decimation factor D with respect to the number of samples of the inputted PRACH sequence.

Those skilled in the art will understand that the above described overlap and save methodology to decimate/downsample the PRACH input sequence may be adjusted in several ways to produce the same result. For instance, the overlapping portions may be arranged at the beginning and end of each input block $x_n$. As exemplarily illustrated in FIG. 7, each input block $x_n$ may overlap by $N_0$ samples with the previous input block $x_{n-1}$ and the subsequent input block $x_{n+1}$. In case a previous input block $x_{n-1}$ or the subsequent input block $x_{n+1}$ does not exist, $N_0$ zero value samples are padded at the beginning of the input block $x_0$ and the end of the of the input block $x_{M-1}$, respectively. Accordingly, the $L_0/2=N_0/D$ samples are discarded at both the beginning and the end of each output block $z_n$ before concatenating.

For the sake of understanding and completeness, it should be noted that when using the above illustrated overlap and save methodology described for instance in detail by Shogo Muramatsu and Hitoshi Kiya in "Extended Overlap-Add and -Save Methods for Multirate Signal Processing" published in IEEE Transactions on Signal Processing, Vol. 45, No. 9, pages 2376-2380, September 1997 conditions have to be observed. The main conditions include— the number of overlap samples should be at least equal to the order $N_r$ of the low-pass FIR filter minus 1 ($N_r-1 \leq 2N_0$);

the number of the overlap samples should be a multiple of the decimation factor D ($2N_0=k_1 D$, where $k_1$ is integer); and the length of the frequency-domain transform (DFT) should be a multiple of the decimation factor D ($N=N_s + 2N_0=k_2 D$, where $k_2$ is integer).

It is immediately understood by those skilled in the art that appropriate conditions can be found for processing PRACH signals by the decimator component 200 described above.

Figure 8:
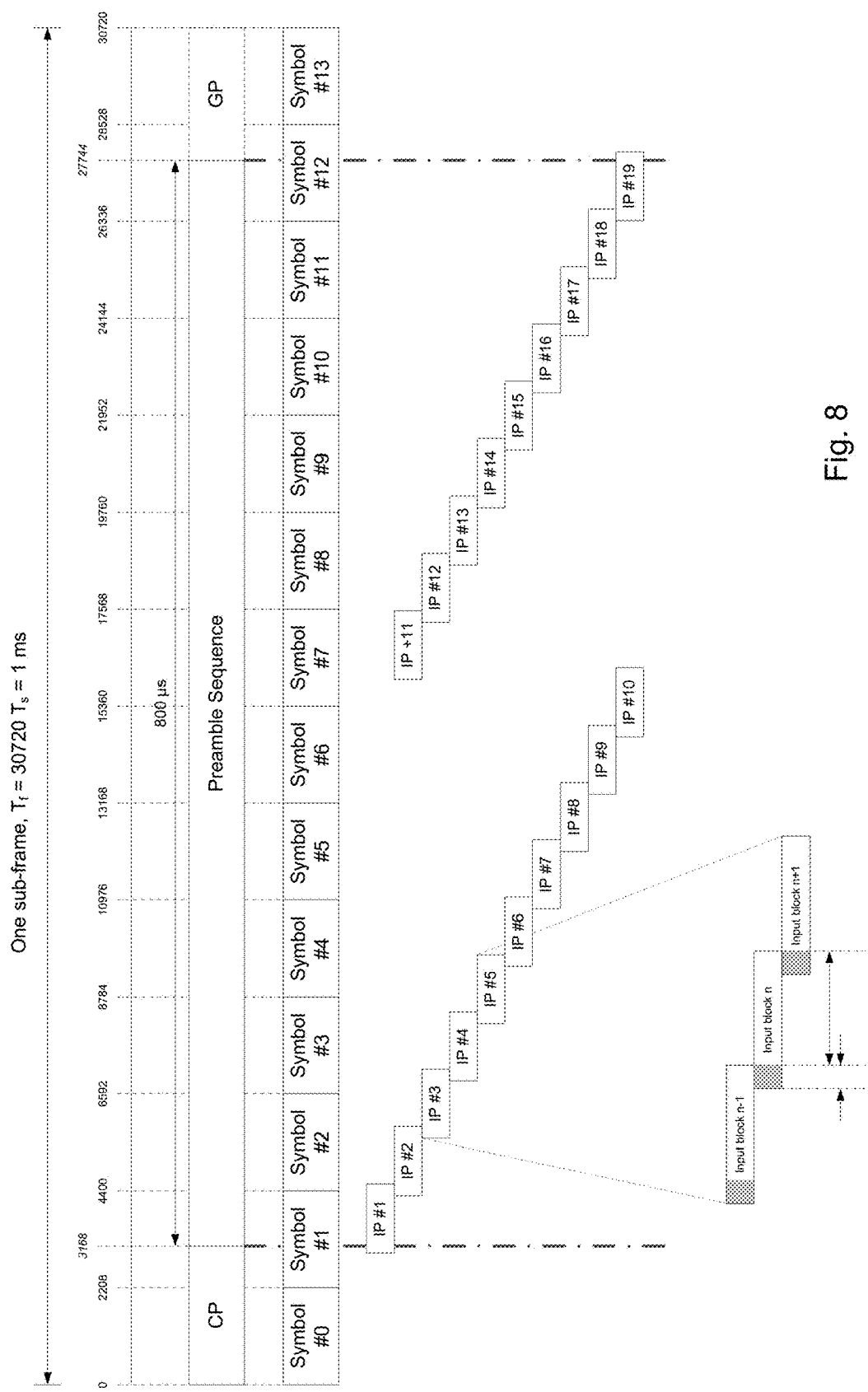
FIG. 8 schematically illustrates the partitioning of a PRACH preamble signal in time domain to be applied for decimation by the decimator of FIG. 5 according to an example of the present application.

Referring now to FIG. 8, a time diagram illustrating a PRACH signal according to a preamble format 0 with respect to the OFDM slot structure is exemplarily shown. As set forth above with reference to FIG. 3, a PRACH signal in accordance with preamble format for FDD operation comprises a cyclic prefix of length $T_{CP}=3168$ $T_s \approx 103.13$ μs (microseconds) and a preamble sequence of length $T_{SEQ}=24576$ $T_s=0.8$ ms. The time diagram depicts a partitioning to the preamble sequence of the PRACH signal into 19 partitions representing the input blocks IP #1 to IP #19 applicable for a system using a bandwidth of 20 MHz and a decimation ratio of D=12. The edges of the cyclic prefix and the guard period are indicated.

Those skilled in the art understand from the time diagram in FIG. 8, that none, one or two frequency domain operations of the decimator component 200 are performed with respect to the OFDM symbol timing. As further understood from the time diagram shown in FIG. 8, a sample sequence of a PRACH signal with preamble format 0 (preamble length 800 μs) transmitted at a bandwidth of 20 MHz can be partitioned into 19 input blocks each having a length, which is smaller than the sample sequence of an OFDM symbol. Accordingly, frequency domain transforming components and time domain transforming components configured to convert OFDM symbol sample sequences are applicable to be used for decimating by a decimator component 200 according to an example of the present application.

For the sake of example, an input block length of N=1536 samples is suggested, which comprises $N_s=1308$ new samples and an overlap of $2N_0=288$ samples. Accordingly, a 1536-point DFT component is applicable for converting the input block into frequency domain. The output block length results to $L=N/D=1536/12=128$ samples with $L_s=109$ samples to concatenate and an overlap of $2L_0=288/12=19$ samples. Accordingly, a 128-point iDFT component is applicable for converting the aliased block $Z_n$ into time domain.

Figure 9:
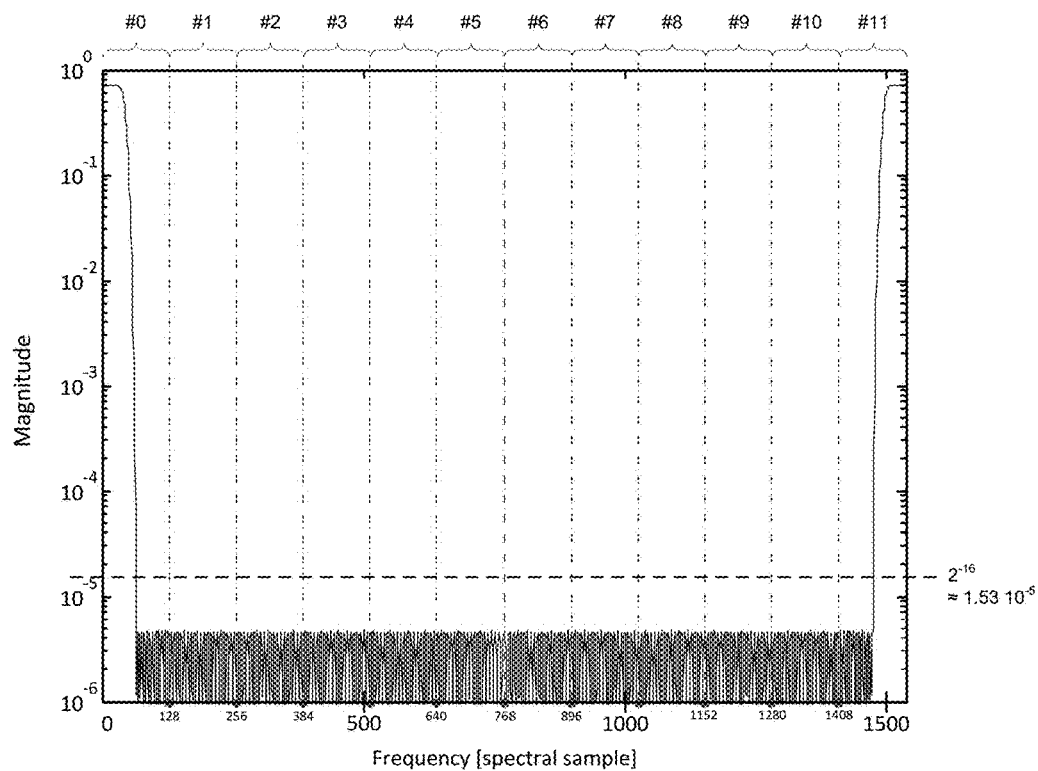
FIGS. 9 and 10 show diagrams of graph diagrams illustrating an exemplary low-pass FIR filter in frequency domain to be used for decimation by the decimator of FIG. 5 according to examples of the present application.
Figure 10:
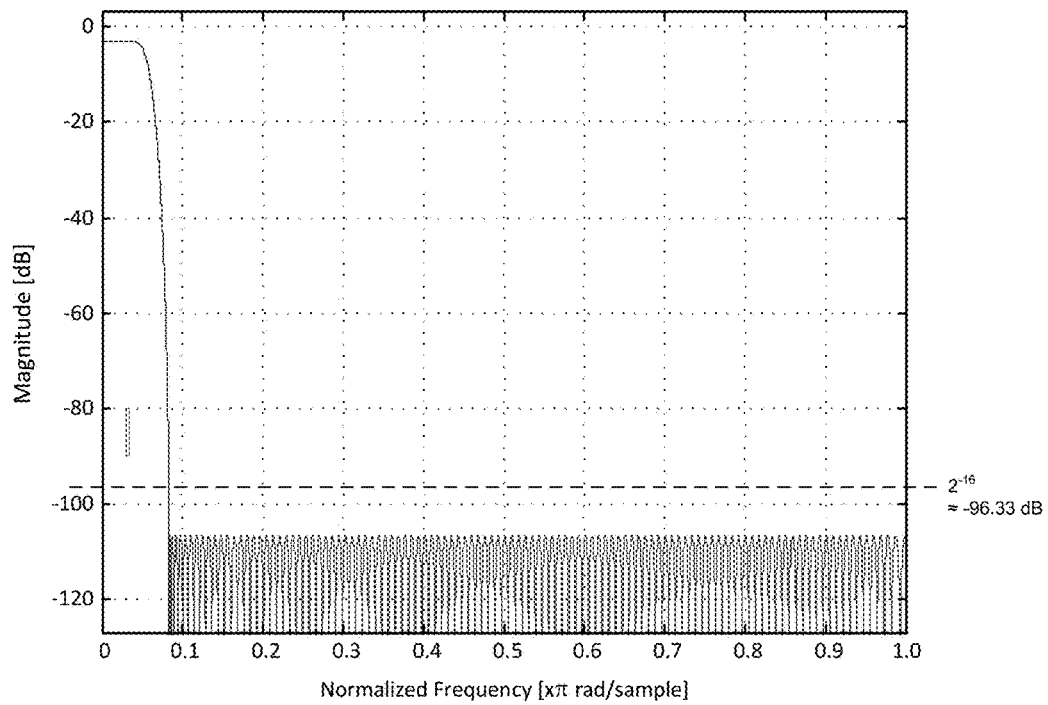

FIGS. 9 and 10 show graph diagrams illustrating an exemplary low-pass FIR filter in frequency domain to be used for decimation by the decimator component 200. The low-pass FIR filter is designed to reject the spectral aliases.

As further understood from the graph diagrams shown in FIGS. 9 and 10, the stop band of the low-pass FIR filter should be designed to have a maximized spectral attenuation of the respective frequencies in the stop band range of the low-pass FIR filter. The attenuation in the stop band range is designed to exceed the working range precision of the processing operations in the frequency domain of the decimator component 200. Herein, any low-pass FIR filter values below $2^{-16} \approx 1.53 \cdot 10^{-5} \approx -96.22$ dB are replaced with zero values or considered as zero values. Hence, the multiplications operations of the spectral samples of the low-pass FIR filter sequence H(K) with the spectral samples of the frequency-mapped input block $X_n(k)$ can be omitted for those spectral samples of the stop band of the low-pass FIR filter sequence H(K).

For the sake of illustration, 12 spectral folding ranges according to a decimation factor D=12 are additionally shown in FIG. 9. The spectral folding ranges shown in FIG. 9 correspond to the frequency ranged of the aliasing blocks obtained by partitioning the spectral product sequence $Y_n$ into 12 aliasing blocks of the same length, herein each spectral folding range comprises 128 spectral samples in accordance with the PRACH signal partitioning example aforementioned with reference to FIG. 8.

Figure 11:
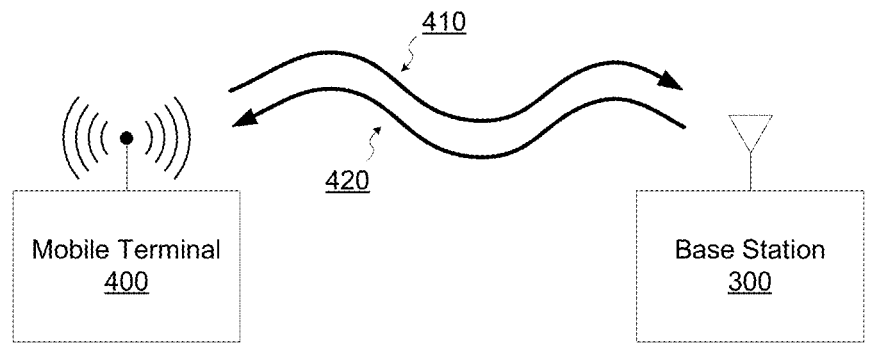
FIG. 11 is a schematic system diagram of a mobile communication system according to an example of the present invention.

FIG. 11 shows an example of a mobile communication system with a mobile terminal 400 in a cell (not shown) that is served by a base station 300. The present application may be applied in a receiver of a base station. A base station may be a station that communicates with the cellular devices (user equipment, UEs) and may be likewise referred to as a NodeB, eNodeB, an access point, etc.

Each base station may provide communication coverage for a particular geographic area. In 3GPP, the term "cell" can refer to a coverage area of a NodeB/eNodeB and/or an NodeB/eNodeB subsystem serving this coverage area, depending on the context in which the term is used. A base station may provide communication coverage for a macro cell, a metro cell, a nano cell, a pico cell, a femto cell, and/or other types of cell. The base station are accordingly designated. The designations of the base station/cells/(e)NodeBs may be understood as indication of a dimension of the coverage area and the number of simultaneously served UEs.

Upon calling (at the beginning of random access communication), the mobile terminal 400 sends a PRACH (Physical Random Access Channel) preamble, which notifies a desire to start the random access communication, to the base station 300 by uplink 410 prior to sending a message. The mobile terminal 400 selects one from various kinds of preamble patterns and generates a preamble according to the selected preamble pattern.

The base station 300 receives the preamble, and detects a pattern of signals of the received preamble to obtain a correlation between the received preamble and a predetermined preamble pattern. Then, the base station 300 determines whether the base station 400 should send a message in response to the detected preamble pattern. When the base station 300 approves the message sending, the base station 300 sends an ACK (Acknowledge) to the mobile terminal 400 through a PDSCH (Physical Downlink Shared Channel) through downlink 420. When the base station 300 disapproves the message sending, the base station 300 sends nothing. When the base station 300 has searched all kinds of the preamble patterns and has detected nothing that correlates with the received preamble pattern, the base station 300 sends nothing, either.

When the mobile terminal 400 receives the ACK in a certain period after sending the preamble, the mobile terminal 400 sends the message to the base station 300 through the uplink 410. If the mobile terminal 400 detects that no response has been received from the base station 300, the mobile terminal 400 repeats the above-described operation.

Figure 12:
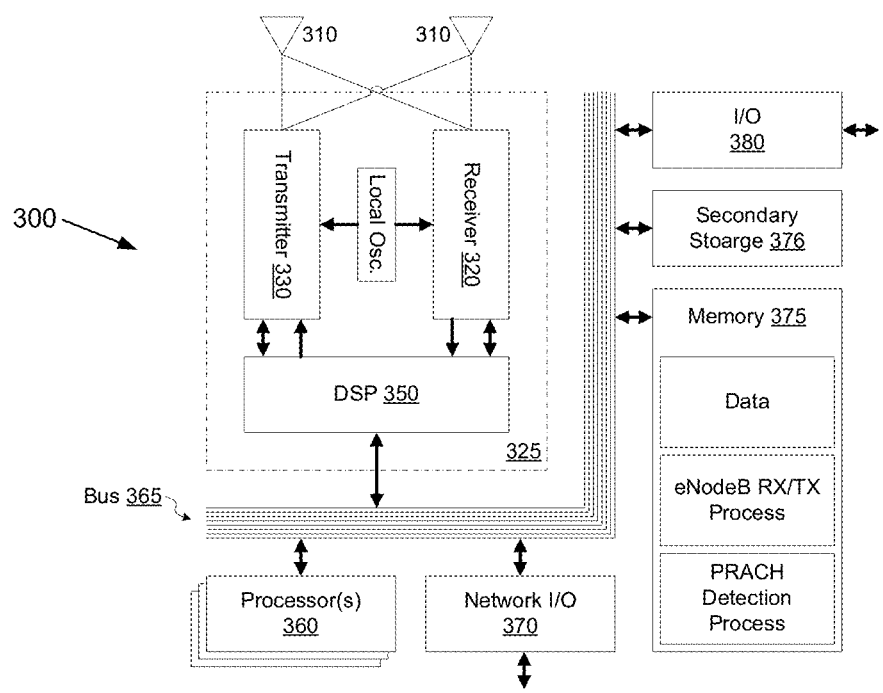
FIG. 12 schematically illustrates a block diagram of an exemplary receiver according to an embodiment of the present application.

The PRACH receiver functionality exemplarily described above with reference to FIG. 5 may be part of a RX/TX (receive and transmit) process of the base station. With reference to FIG. 12, a possible implementation of a receiver arrangement 100 as part of an example base station 300 is illustratively shown. In general, the base station 300 is configured according to an example of the present disclosure.

Signals received from antennas 310 are input to a transceiver 325, which comprises for instance a receiver section 320 and a transmitter section 330. The receiver section 320 may perform such common receiver functions as signal amplification, frequency downconversion (frequency shifting), filtering, channel selection and the like. Analog to digital (ADC) conversion of a received signal allows more complex communication functions such as demodulation and decoding to be performed in a digital signal processor (DSP) 350. In a similar manner, signals to be transmitted are processed, including modulation and encoding for example, by the DSP 350 and input to transmitter section 330 for digital to analog (DAC) conversion, frequency up conversion, filtering, amplification and transmission over the cellular communication network via the antennas 310. The DSP 350 not only processes communication signals, but also provides for receiver and transmitter control. For example, the gains applied to communication signals in receiver 320 and transmitter 330 may be adaptively controlled through automatic gain control algorithms implemented in DSP 350.

In addition to a processor 360 (which may be referred to as a central processor unit or CPU), the base station 300 might include network connectivity devices 370, a memory 375 including random access memory (RAM) and read only memory (ROM), a secondary storage 376, and input/output (I/O) devices. These components may communicate with one another via one or more buses 365, switched interconnects, fabrics, and/or any combination thereof. In some cases, some of these components may not be present or may be combined in various combinations with one another or with other components not shown. These components might be located in a single physical entity or in more than one physical entity. Any actions described herein as being taken by the base station 300 might be taken by any one of the components thereof, a combination of the components thereof, the processor 360 alone or by the processor 350 in conjunction with one or more components shown or not shown in FIG. 12, such as a digital signal processor (DSP) 350. Although the DSP 350 is shown as a separate component, the DSP 350 might be incorporated into the processor 360.

The central processor 360 and the digital signal processor (DSP) 350 should be understood as processing units, which execute instructions, codes, computer programs, or scripts that it might access from the network connectivity devices 370, the input/output (I/O) devices, the memory 375 (e.g. RAM and/or ROM) or secondary storage 376, which might include various disk-based systems such as hard disk, floppy disk, or optical disk or any other mass storage technology based devices. While only one CPU 360 and/or DPS 350 is shown, multiple processors or processing cores may be present. Thus, while instructions may be discussed as being executed by one or the processors, the instructions may be executed simultaneously, serially, or otherwise by one or multiple processors. The processor 360 may be implemented as one or more CPU chips.

The network connectivity devices 370 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, LTE-A (LTE advanced) radio transceiver devices, worldwide interoperability for microwave access (WiMAX) devices, and/or other well-known devices for connecting to networks. These network connectivity devices 370 may enable the processor 360 to communicate with the Internet or with one or more telecommunications networks or other networks from which the processor 360 might receive information or to which the processor 360 might output information. The network connectivity devices 370 might also include one or more transceiver components capable of transmitting and/or receiving data wirelessly.

The RAM might be used to store volatile data and perhaps to store instructions that are executed by the processor 360. The ROM is a non-volatile memory device that typically has a smaller memory capacity than the memory capacity of the secondary storage 376. ROM might be used to store instructions and perhaps data that are read during execution of the instructions. Access to both RAM and ROM is typically faster than to secondary storage 376, which may server as a mass storage. The secondary storage 376 is typically comprised of one or more solid state drives, disk drives or tape drives and might be used for non-volatile storage of data or as an over-flow data storage device if RAM is not large enough to hold all working data. Secondary storage 376 may be used to store programs that are loaded into RAM when such programs are selected for execution.

Further, one or more I/O devices 380 may include liquid crystal displays (LCDs), touch screen displays, keyboards, keypads, switches, mice, card readers, video monitors, or other well-known input/output devices. The transceiver 325 might be also considered to form a component of the I/O devices 380 instead of or in addition to being a component of the network connectivity devices 370.

As will be readily apparent to one skilled in the art, the RX/TX process may configure the one or more processors 350, 360 to operate the transceiver 325 in a manner that provides voice communication and data services over a wireless radio frequency cellular communications network. The PRACH detection process block may configure the one or more processors 350, 360 to operate the receiver 100 as described above with reference to FIG. 5. In particular, the PRACH detection process block is implemented on the basis of one or more software components executable on the one or more processor(s) 360 and the digital signal processor (DSP) 350. More particularly, the PRACH detection process block is configured to make use of frequency-domain and time-domain transform accelerator components implemented in the base station 300 such as one or more Fast Fourier Transform (FFT) and/or Discrete Fourier Transform (DFT) components being part of the digital signal processor (DSP) 350.

It should be noted that the aforementioned frequency-domain transform components may be implemented as Fast Fourier Transform (FFT) components or Discrete Fourier Transform (DFT) components. Whereas a FFT component is far more efficient computationally, a DFT component is not limited to a power-of-two transform size contrary to a FFT component, which is limited to a power-of-two size transform size. The suggested fast convolution algorithms for a PRACH receiver according to an example of the present application apply equally well for a DFT transform as well as a FFT transform.

While the invention has been described with reference to illustrative embodiments, this description is not intended to be construed in a limiting sense. Various other embodiments of the invention will be apparent to persons skilled in the art upon reference to this description.

Embodiments of this invention apply to any flavor of frequency division multiplex based transmission. Thus, the concept of valid specification of sub-channels can easily be applied to: OFDMA (Orthogonal Frequency-Division Multiple Access), OFDM (Orthogonal Frequency-Division Multiplexing), DFT-spread OFDM, DFT-spread OFDMA, SC-OFDM (Single-Carrier Orthogonal Frequency-Division Multiplexing), SC-OFDMA (Single-carrier Orthogonal Frequency-Division Multiple Access), MC-CDMA (Multi-Carrier Code Division Multiple Access), and all other FDM (Frequency-Division Multiplexing)-based transmission strategies.

The examples described herein focus on the PRACH preamble, but could apply to any other OFDM symbol or OFDM-like symbols where it is seen convenient to implement the decimator approach. Such symbols may be the case of e.g. LTE-A (LTE Advanced), which might similarly involve very large FFTs.

In the following more general examples of the present applications are set forth and are intended be understood in the context of the above exemplifying examples. According to an example of the present application, a receiver for performing a decimation on a signal for pattern detection is provided, which comprises a frequency-domain decimator component 200 and a pattern detector component 190. The frequency-domain decimator component 200 is coupled to at least one antenna to receive an input sequence x of samples of the signal received at the at least one antenna. The received signal comprises an access pattern. The frequency-domain decimator component 200 is further configured to apply an anti-aliasing filter and to decimate the input sequence x. The frequency-domain decimator component 200 is further arranged to output the input sequence x filtered and decimated as output sequence z. The pattern detector component 190 is coupled to the frequency-domain decimator component 200 to receive the output sequence z. The pattern detection component 190 is further configured to perform a pattern detection based on cross-correlation values in frequency domain between the output sequence and predefined patterns.

According to an example of the present application, the frequency-domain decimator component 200 is further configured to decimate the input sequence by a predefined decimation factor. The output sequence comprises a number of samples reduced by the predefined decimation factor in relationship to the number of samples of the input sequence.

According to an example of the present application, the frequency-domain decimator component 200 is further configured to apply an overlap and save method for filtering and decimating.

According to an example of the present application, the frequency-domain decimator component 200 further comprises a signal partitioner component 210 and a signal concatenator component 260. The signal partitioner component 210 is arranged to partition the input sequence into a number of input blocks $x_n$ each having the same length and overlapping in time by a predefined number of samples. The signal concatenator component 260 is arranged to remove a predefined number of samples overlapping from output blocks $z_n$ and to concatenate the remaining part of the of the output blocks $z_n$ to form the output sequence z.

According to an example of the present application, the frequency-domain decimator component (200) further comprises an N-point frequency-domain transform component 230 and an L-point time-domain transform component 270. The N-point frequency-domain transform component 230 is arranged to sequentially receive the input blocks $x_n$ and to transform the input blocks $x_n$ into frequency-mapped input blocks $X_n$ in frequency domain. The L-point time-domain transform component 270 is arranged to sequentially receive frequency-mapped output blocks $Z_n$ and to transform the frequency-mapped output blocks $Z_n$ into output blocks $z_n$ in time domain. In particular, the product of L and the decimation factor is equal to N.

According to an example of the present application, the frequency-domain decimator component 200 further comprises a mixer component 240 to apply the anti-aliasing filter. The mixer component 240 is arranged to receive a frequency-mapped input block $X_n$ and to generate a spectral product block $Y_n$ by multiplying the frequency-mapped input block $X_n$ and a frequency-mapped filter sequence H(k). The frequency-mapped input block $X_n$ and a frequency-mapped filter sequence H(k) have the same number of spectral samples.

According to an example of the present application, the decimator component 200 further comprises an aliasing component (260) to decimate the input sequence. The aliasing component 260 is arranged to partition the spectral product block $Y_n$ into a predefined number of aliasing blocks $Y_n^{(l)}(k)$ and to coherently add the aliasing blocks $Y_n^{(l)}(k)$ to obtain an aliased block $Z_n$ forming a frequency-mapped output block $Z_n$. The predefined number of aliasing blocks $Y_n^{(l)}(k)$ corresponds to a predefined decimation factor. The frequency-mapped output block $Z_n$ comprises the number of spectral samples reduced by the predefined decimation factor in relationship to the frequency-mapped input block $X_n$.

According to an example of the present application, the anti-aliasing filter is a low-pass, LP, frequency impulse response, FIR, filter. The magnitudes of the stop band of the LP FIR filter exceeds the dynamic range defined by the numerical value representation in the frequency domain.

According to an example of the present application, the stop band of the LP FIR filter attenuates the spectral samples of the frequency-mapped input blocks $X_n$ below the minimum representable value defined by the numerical value representation used for the spectral samples of the frequency-mapped input blocks $X_n$. The mixer component 240 is further arranged to omit the multiplying of spectral samples at the stop band frequencies, which spectral samples are attenuated below the minimum representable value, and to set the spectral samples of the spectral product block $Y_n$ at the stop band frequencies to zero values.

According to an example of the present application, the aliasing component 260 is further configured to disregard aliasing blocks $Y_n^{(l)}(k)$ comprising zero value spectral samples.

According to an example of the present application, the predefined patterns for pattern detection are based on a cyclic shifted Zadoff-Chu root sequence.

According to an example of the present application, a method of performing a decimation on a signal for pattern detection is provided. An input sequence x of samples of the signal received at least one antenna is received. The received signal comprises an access pattern. An anti-aliasing filter in frequency domain is applied to the input sequence x. The input sequence is decimated in frequency domain by a frequency-domain decimator component 200 to generate a filtered and decimated input sequence as an output sequence z. A pattern detection is performed based on cross-correlation values in frequency domain between the output sequence z and predefined patterns by a pattern detector component 190.

According to an example of the present application, the decimating in frequency domain further comprises decimating the input sequence x by a predefined decimation factor. The output sequence z comprises a number of samples reduced by the predefined decimation factor in relationship to the number of samples of the input sequence x.

According to an example of the present application, the input sequence x is partitioned into a number of input blocks $x_n$ each having the same length and overlapping in time by a predefined number of samples. A predefined number of samples overlapping in time domain is removed from the output blocks $z_n$ and the remaining parts of the of the output blocks $z_n$ are concatenated to obtain the output sequence z.

According to an example of the present application, the input blocks $x_n$ are received sequentially in time and the input blocks $x_n$ are transformed into frequency-mapped input blocks $X_n$ in frequency domain by an N-point frequency-domain transform component 230. Frequency-mapped output blocks $Z_n$ are received sequentially in time and the frequency-mapped output blocks $Z_n$ are transformed into output blocks $z_n$ in time domain by an L-point time-domain transform component 270.

According to an example of the present application, the anti-aliasing filter is applied by multiplying each frequency-mapped input block $X_n$ and a frequency-mapped filter sequence $H(k)$ to generate a spectral product block $Y_n$. Each frequency-mapped input block $X_n$ and the frequency-mapped filter sequence $H(k)$ have the same number of spectral samples.

According to an example of the present application, the decimating further comprises partitioning each spectral product block $Y_n$ into a predefined number of aliasing blocks $Y_n^{(l)}(k)$ and coherently adding the aliasing blocks $Y_n^{(l)}(k)$ to obtain an aliased block $Z_n$ forming a frequency-mapped output block $Z_n$. The predefined number of aliasing blocks $Y_n^{(l)}(k)$ corresponds to the predefined decimation factor. Each frequency-mapped output block $Z_n$ comprises the number of spectral samples reduced by the predefined decimation factor in relationship to the frequency-mapped input block $X_n$.

According to an example of the present application, a low-pass, LP, frequency impulse response, FIR, filter is provided as the anti-aliasing filter. The magnitudes of the stop band of anti-aliasing filter exceed the dynamic range defined by the numerical value representation in the frequency domain.

According to an example of the present application, the multiplying of spectral samples at the stop band frequencies, which spectral samples are attenuated below the minimum representable value, is omitted. The spectral samples of the spectral product block $Y_n$ at the stop band frequencies are set to zero values.

According to an example of the present application, a non-transitory, tangible computer readable storage medium is provided bearing computer executable instructions of performing a decimation on a signal for pattern detection, wherein the instructions, when executing on one or more processing devices, cause the one or more processing devices to perform the aforementioned method of performing a decimation on a signal for pattern detection.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical components, modules, circuits, and algorithm steps described in connection with the disclosure herein may be implemented as electronic hardware, computer software, or combinations of both. To illustrate clearly this interchangeability of hardware and software, various illustrative components, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical components, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A receiver for performing a decimation on a signal for pattern detection, said apparatus comprising:
    a frequency-domain decimator component coupled to at least one antenna to receive an input sequence of samples of the signal received at the at least one antenna,
    wherein the received signal comprises an access pattern,
    wherein the frequency-domain decimator component is configured to apply an anti-aliasing filter and to decimate the input sequence,
    wherein the frequency-domain decimator component is further arranged to output the input sequence filtered and decimated as output sequence; and
    a pattern detector component coupled to the frequency-domain decimator component to receive the output sequence, wherein the pattern detection component is configured to perform a pattern detection based on cross-correlation values in frequency domain between the output sequence and predefined patterns;
    wherein the frequency-domain decimator component further comprises:
        a signal partitioner component arranged to partition the input sequence into a number of input blocks each having the same length and overlapping in time by a predefined number of samples;
        a signal concatenator component arranged to remove a predefined number of samples overlapping from output blocks and to concatenate the remaining part of the of the output blocks to form the output sequence;
        an N-point frequency-domain transform component arranged to sequentially receive the input blocks and to transform the input blocks into frequency-mapped input blocks in frequency domain; and
        an L-point time-domain transform component arranged to sequentially receive frequency-mapped output blocks and to transform the frequency-mapped output blocks into output blocks in time domain.

2. The receiver according to claim 1,
    wherein the frequency-domain decimator component is configured to decimate the input sequence by a predefined decimation factor,
    wherein the output sequence comprises a number of samples reduced by the predefined decimation factor in relationship to the number of samples of the input sequence.

3. The receiver according to claim 1,
    wherein the frequency-domain decimator component is configured to apply an overlap and save method for filtering and decimating.

4. The receiver according to claim 1, wherein the frequency-domain decimator component further comprises:
    a mixer component to apply the anti-aliasing filter arranged to receive a frequency-mapped input block and to generate a spectral product block by multiplying the frequency-mapped input block and a frequency-mapped filter sequence, wherein the frequency-mapped input block and a frequency-mapped filter sequence have the same number of spectral samples.

5. The receiver according to claim 4, wherein the decimator component further comprises:
    an aliasing component to decimate the input sequence arranged to partition the spectral product block into a predefined number of aliasing blocks and to coherently add the aliasing blocks to obtain an aliased block forming a frequency-mapped output block,
    wherein the predefined number of aliasing blocks corresponds to a predefined decimation factor,
    wherein the frequency-mapped output block comprises the number of spectral samples reduced by the predefined decimation factor in relationship to the frequency-mapped input block.

6. The receiver according to claim 4,
    wherein the anti-aliasing filter is a low-pass, LP, frequency impulse response, FIR, filter,
    wherein the magnitudes of the stop band of the LP FIR filter exceeds the dynamic range defined by the numerical value representation in the frequency domain.

7. The receiver according to claim 6,
wherein the stop band of the LP FIR filter attenuates the spectral samples of the frequency-mapped input blocks below the minimum representable value defined by the numerical value representation used for the spectral samples of the frequency-mapped input blocks,
wherein the mixer component is further arranged to omit the multiplying of spectral samples at the stop band frequencies, which spectral samples are attenuated below the minimum representable value, and to set the spectral samples of the spectral product block at the stop band frequencies to zero values.

8. The receiver according to claim 7,
wherein the aliasing component is further configured to disregard aliasing blocks comprising zero value spectral samples.

9. The receiver according to claim 1,
wherein the predefined patterns for pattern detection are based on a cyclic shifted Zadoff-Chu root sequence.

10. A method of performing a decimation on a signal for pattern detection, said method comprising:
receiving an input sequence of samples of the signal received at least one antenna, wherein the received signal comprises an access pattern;
applying an anti-abasing filter in frequency domain on the input sequence;
decimating the input sequence in frequency domain by a frequency-domain decimator component to generate a filtered and decimated input sequence forming an output sequence;
performing a pattern detection based on cross-correlation valises in frequency domain between the output sequence and predefined patterns by a pattern detector component;
partitioning the input sequence into a number of input blocks each having the same length and overlapping in time by a predefined number of samples;
removing a predefined number of samples overlapping in time from each output blocks and concatenating the remaining parts, of the of the output blocks (zn) to form the output sequence;
sequentially receiving the input blocks and transforming the input blocks into frequency-mapped input blocks in frequency domain by an N-point frequency-domain transform component; and
sequentially receiving frequency-mapped output blocks and transforming the frequency-mapped output blocks into output blocks in time domain by an L-point time-domain transform component.

11. The method according to claim 10,
wherein the decimating in frequency domain comprises decimating the input sequence by a predefined decimation factor,
wherein the output sequence comprises a number of samples reduced by the predefined decimation factor in relationship to the number of samples of the input sequence.

12. The method according to claim 10, further comprising:
applying the anti-aliasing filter by multiplying each frequency-mapped input block and a frequency-mapped filter sequence to generate spectral product blocks, wherein the frequency-mapped input blocks and the frequency-mapped filter sequence have the same number of spectral samples.

13. The method according to claim 12,
wherein the decimating further comprises partitioning each spectral product block into a predefined number of aliasing blocks and coherently adding the aliasing blocks to obtain an abased block forming a frequency-mapped output block,
wherein the predefined number of aliasing blocks corresponds to the predefined decimation factor,
wherein each frequency-mapped output block comprises the number of spectral samples reduced by the predefined decimation factor in relationship to the frequency-mapped input block.

14. The method according to claim 12, further comprising:
providing a low-pass, LP, frequency impulse response, FIR, filter as the anti-abasing filter, the magnitudes of the stop band of which exceed the dynamic range defined by the numerical value representation in the frequency domain.

15. The method according to claim 12, further comprising:
omitting the multiplying of spectral samples at the stop band frequencies, which spectral samples are attenuated below the minimum representable value; and
setting the spectral samples of the spectral product block at the stop band frequencies to zero values.

16. A non-transitory, tangible computer readable storage medium bearing computer executable instructions of performing a decimation on a signal for pattern detection, wherein the instructions, when executing on one or more processing devices, cause the one or more processing devices to perform a method comprising:
receiving an input sequence of samples of the signal received at at least one antenna,
wherein the received signal comprises an access pattern;
applying an anti-aliasing filter in frequency domain on the input sequence;
decimating the input sequence in frequency domain by a frequency-domain decimator component to generate a filtered and decimated input sequence forming an output sequence;
perform a pattern detection based on cross-correlation values in frequency domain between the output sequence and predefined patterns by a pattern detector component;
partition the input sequence into a number of input blocks each having the same length and overlapping in time by a predefined number of samples;
remove a predefined number of samples overlapping in time from each output blocks and concatenating the remaining parts of the of the output blocks (zn) to form the output sequence;
sequentially receive the input blocks and transforming the input blocks into frequency-mapped input blocks in frequency domain by an N-point frequency-domain transform component; and
sequentially receive frequency-mapped output blocks and transforming the frequency-mapped output blocks into output blocks in time domain by an L-point time-domain transform component.

17. A receiver for performing a decimation on a signal for pattern detection, said apparatus comprising:
a frequency-domain decimator component coupled to at least one antenna to receive an input sequence of samples of the signal received at the at least one antenna,
wherein the received signal comprises en access pattern, wherein the frequency-domain decimator component is configured to apply an anti-aliasing filter and, to decimate the input sequence,
wherein the frequency-domain decimator component is further arranged to output the input sequence filtered and decimated as output sequence; and
a pattern detector component coupled to the frequency-domain decimator component to receive the output sequence, wherein the pattern detection component is configured to perform a pattern detection based on cross-correlation values in frequency domain between the output sequence and predefined patterns;
wherein the frequency-domain decimator component further comprises:
  a mixer component to apply the anti-aliasing filter arranged to receive a frequency-mapped input block and to generate a spectral product block by multiplying the frequency-mapped input block and a frequency-mapped filter sequence, wherein the frequency-mapped input block and a frequency-mapped filter sequence have the same number of spectral samples;
wherein the anti-aliasing filter is a low-pass, LP, frequency impulse response, FIR, filter,
wherein the magnitudes of the stop band of the LP FIR filter exceeds the dynamic range defined by the numerical value representation in the frequency domain.

* * * * *